US007107529B2

(12) United States Patent
Lee

(10) Patent No.: US 7,107,529 B2
(45) Date of Patent: Sep. 12, 2006

(54) METHOD FOR DISPLAYING MANUAL OF VIDEO APPARATUS AND APPARATUS THEREFOR

(75) Inventor: Jae Kyung Lee, Daeku (KR)

(73) Assignee: LG Electronics Inc., Seoul (KR)

( * ) Notice: Subject to any disclaimer, the term of this patent is extended or adjusted under 35 U.S.C. 154(b) by 441 days.

(21) Appl. No.: 09/994,839

(22) Filed: Nov. 28, 2001

(65) Prior Publication Data

US 2002/0063730 A1 May 30, 2002

(30) Foreign Application Priority Data

Nov. 29, 2000 (KR) ................................ 2000-71619

(51) Int. Cl.
*G06F 3/00* (2006.01)
*G11B 27/00* (2006.01)
(52) U.S. Cl. ...................... 715/705; 715/717; 715/727; 725/37
(58) Field of Classification Search ................. 345/705, 345/708, 710, 714, 716, 718; 725/51, 40, 725/60, 37; 715/708, 705, 716, 717, 727
See application file for complete search history.

(56) References Cited

U.S. PATENT DOCUMENTS

| 4,907,085 | A | * | 3/1990 | Bingham | 348/706 |
|---|---|---|---|---|---|
| 4,958,297 | A | * | 9/1990 | Hansen | 345/723 |
| 6,075,527 | A | * | 6/2000 | Ichihashi et al. | 345/721 |
| 6,267,599 | B1 | * | 7/2001 | Bailey | 434/262 |
| 6,396,962 | B1 | * | 5/2002 | Haffey et al. | 382/298 |
| 6,476,825 | B1 | * | 11/2002 | Croy et al. | 345/716 |
| 6,829,779 | B1 | * | 12/2004 | Perlman | 725/37 |
| 2002/0051008 | A1 | * | 5/2002 | Mathis et al. | 345/705 |

OTHER PUBLICATIONS

Vazquez, Michelle, and Resnick, Marc L. "Supporting Flexible Assembly Through Human Factors", published in the Proceedings of the Human Factors and Ergonomics Society 41st Annual Meeting—1997.*

* cited by examiner

*Primary Examiner*—Kieu D. Vu
*Assistant Examiner*—Ting Zhou
(74) *Attorney, Agent, or Firm*—Fleshner & Kim LLP

(57) ABSTRACT

A method for displaying the manual of a video apparatus for displaying the manual of the corresponding video apparatus on the screen of the video apparatus so that a user can conveniently and correctly understand the usage of the video apparatus and the method for connecting the video apparatus to an external apparatus and an apparatus therefor are provided. According to the method for displaying the manual of the video apparatus and the apparatus therefor, it is determined whether a manual selection signal is input. When the manual selection signal is input, the respective portions of the video apparatus are graphically displayed and the manual of a predetermined portion of the video apparatus is displayed.

22 Claims, 3 Drawing Sheets

METHOD FOR DISPLAYING MANUAL OF VIDEO APPARATUS AND APPARATUS THEREFOR

BACKGROUND OF THE INVENTION

1. Field of the Invention

The present invention relates to a video apparatus, and more particularly, to a method for displaying the manual of a video apparatus having a multimedia function and an apparatus therefor.

2. Description of the Background Art

Electronic apparatuses currently provide various multimedia functions in accordance with the development of a multimedia technology. For example, televisions with various multimedia apparatuses such as videocassette recorders (VCR), camcorders, digital versatile disk players (DVDP), and personal computers (PCs) connected are commonly used. The PCs with a plurality of external apparatuses such as the televisions, audio apparatus, and various peripheral apparatuses connected are used. The range of the use is gradually increasing.

Watching the television is possible only when a plurality of connection terminals for receiving the output signals of the respective apparatuses are included in the television, the connection terminals are connected to the apparatus to be suitable for purposes, and the operation mode of the corresponding apparatus is correctly selected. For example, watching the television is possible only when the plurality of connection terminals for receiving the output signals output from the VCR, the DVDP, and a digital television (DTV) are included in the television, the corresponding apparatus is correctly connected to the corresponding terminal of the television, and the operation mode of the corresponding apparatus is correctly selected.

However, it is difficult for a user to find out a terminal suitable for the corresponding apparatus among the plurality of terminals, to connect the terminal to the corresponding apparatus, and to select the operation mode of the corresponding apparatus. The above contents can be understood by reading a use manual. However, it is difficult to understanding the above contents by reading the use manual. Also, reading the use manual may annoy the user. It is difficult for the user to easily understand the structures and the usages of various apparatuses with the increase of various convenience functions.

Therefore, a method, which is capable of the user easily connecting various apparatuses to the terminals and understanding the function, the operations, and the usages of the various apparatuses, is sincerely required.

As mentioned above, in the conventional technology, there exist a large number of external apparatuses that can be connected to the video apparatus. A plurality of connection terminals for connecting the corresponding external apparatus to the video apparatus are loaded in the video apparatus. A method for connecting the external apparatus to the video apparatus and the structures, the operations, and the usages of the video apparatus are very complicated and difficult for the user.

SUMMARY OF THE INVENTION

Therefore, an object of the present invention is to provide a method for displaying the manual of a video apparatus, which is capable of a user conveniently and easily acquiring the usage of a corresponding video apparatus and a method for connecting the corresponding video apparatus to an external apparatus by displaying a manual including the usage of the corresponding video apparatus and the method for connecting the corresponding video apparatus to the external apparatus on the screen of the corresponding video apparatus, and an apparatus therefor.

To achieve these and other advantages and in accordance with the purpose of the present invention, as embodied and broadly described herein, there is provided a method for displaying the manual of a video apparatus, the method comprising the steps of determining whether a manual selection key signal is input, graphically displaying a video apparatus according to the manual selection key signal, and displaying the manual of a predetermined portion of the video apparatus.

There is provided an apparatus for displaying the manual of a video apparatus, the apparatus comprising a manual data storage unit for graphically showing the respective portions of a video apparatus and storing manual data including the manual of a method for connecting the video apparatus to various external apparatuses, a microcomputer for receiving a manual selection key signal received by a user and outputting a control signal, and a manual display unit for graphically displaying the manual on the screen of the video apparatus according to the control signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

A preferred embodiment of a method for displaying the manual of a television and an apparatus therefor according to the present invention will now be described in detail with reference to FIGS. 1 through 3.

Figure 1:
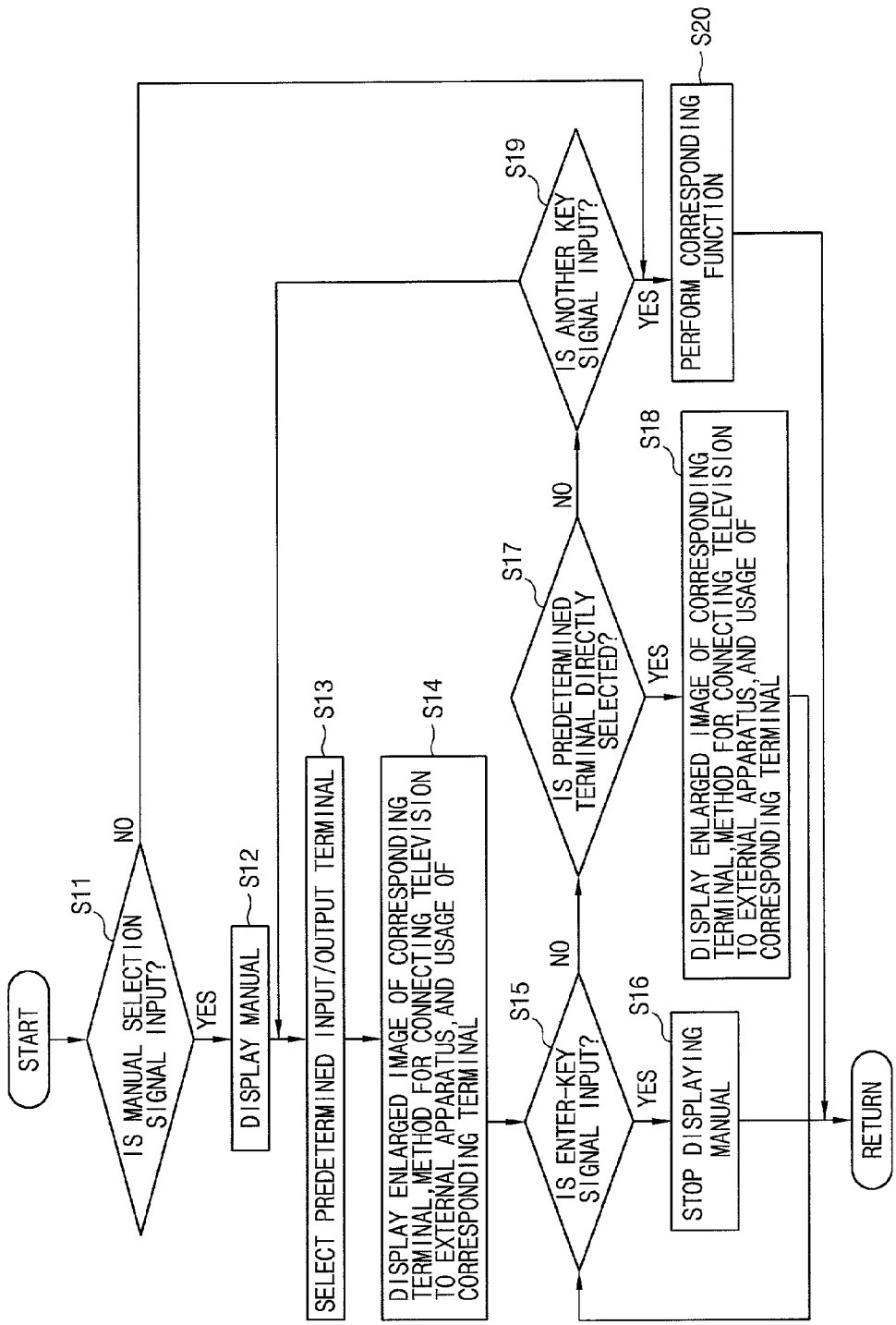
FIG. 1 is a flowchart showing a method for displaying the manual of a television according to the present invention.

FIG. 1 is a flowchart showing a method for displaying the manual of a video apparatus according to the present invention.

As shown in FIG. 1, the usage of a video apparatus (a television) and a method for displaying a manual for connecting the video apparatus to an external apparatus and an apparatus therefor will now be described in detail with reference to FIGS. 2 and 3.

Figure 2:
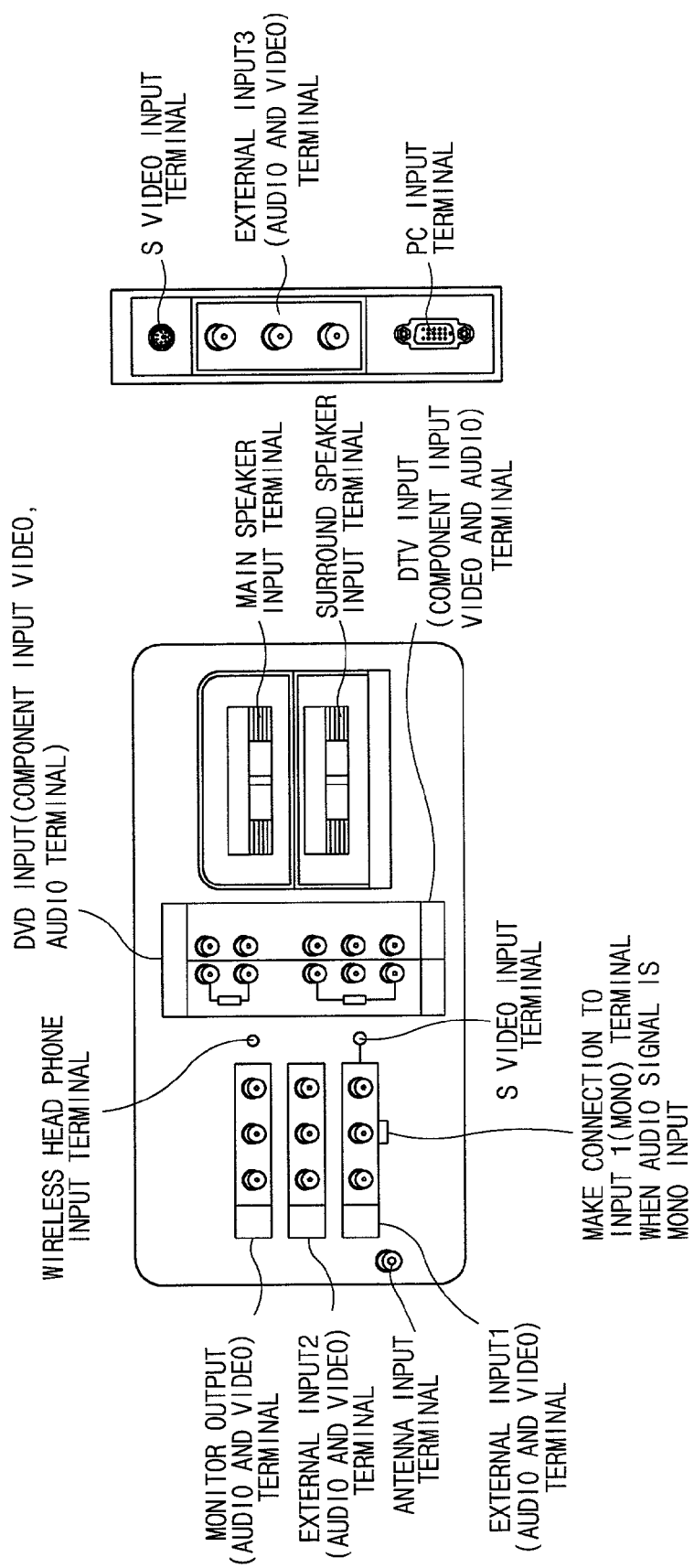
FIGS. 2 and 3 show manuals displayed on a screen according to the present invention.
Figure 3:
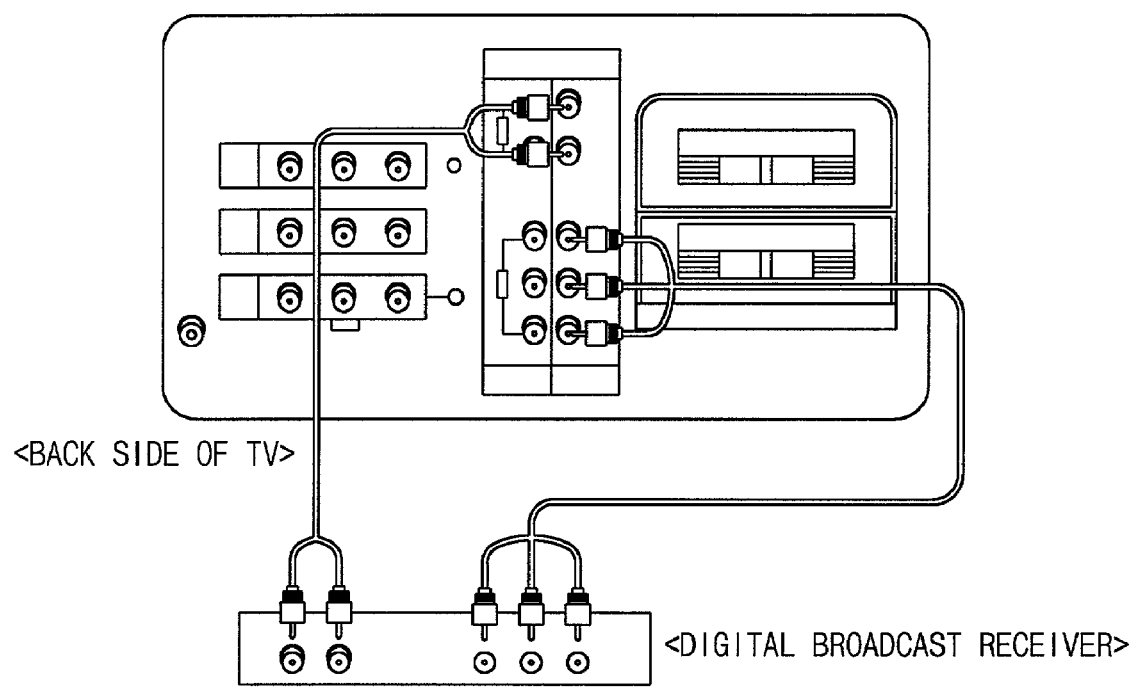

FIGS. 2 and 3 show manuals displayed on the screen of a television according to the present invention.

The microcomputer (not shown) of the television determines whether a user inputs a manual selection signal using an input means such as a remote controller (S11).

The microcomputer outputs a control signal to a manual display unit (not shown) according to manual data previously stored in a manual data storage unit (not shown) and an application program when the manual selection signal is input. The manual data includes a manual showing the usage of the television, the images of the respective parts of the television and the enlarged images of the respective parts of the television, an enlarged image which marks the corresponding terminal among the plurality of input/output terminals of the television, the image of the external apparatus connect portion of the television, a method for connecting the television to various external apparatuses, and the usages.

The manual display unit graphically displays the manual on the screen of the television according to the control signal output from the microcomputer, as shown in FIG. 2 (S12). For example, the manual display unit selects a predetermined input/output terminal among the plurality of input/output terminals of the television in the manual in the order previously set by the control signal (S13). The plurality of input/output terminals include a terminal for connecting an external apparatus.

The manual display unit graphically displays the enlarged image that marks the corresponding terminal among the plurality of input/output terminals, the method for connecting the television to the external apparatus, and the usage on the screen of the television (S14). Also, as shown in FIG. 3, the manual display unit displays the manual including the images of the television and the external apparatus input/output terminal and the method for connecting the television to the external apparatus on the screen of the television and displays a specific message on the screen of the television in the form of on screen display (OSD). For example, when a DVD player connection terminal is described, a message such as "Please select DVD in a mode." Is displayed in the form of an on screen display (OSD) form.

The microcomputer determines whether an enter-key signal is input while the manual is displayed (S15). When the enter-key signal is input, the microcomputer automatically switches the television to the operation mode of the corresponding apparatus and stops processes of displaying the manual including the images of the input/output terminals of the television and the external apparatus and the method for connecting the television to the external apparatus (S16). For example, when the enter-key signal is input during displaying the method for connecting the television to the DVD player, the television is automatically switched to a DVD mode.

When the user directly selects a predetermined terminal using the up/down or left/right key of the remote controller during displaying the manual (S17), the microcomputer stops the processes of displaying the manual, which are sequentially performed and controls the manual display unit to display the enlarged image of the terminal selected by the user, the method for connecting the television to the terminal selected by the user, or the usage of the terminal selected by the user by the same method as the method used in the step S14 (S18).

When a key signal other than the enter-key signal or a terminal selection key signal is input during the display (S19), the microcomputer stops the processes of displaying the manual and performs the corresponding function, that is, the common function of the television (S20). For example, when the user switches the channel of the television using the up/down or left/right direction key of the remote controller, the microcomputer stops the processes of displaying the manual on the screen of the television, switches the channel of the television to the channel selected by the user, and displays the broadcast signal of the switched channel on the screen of the television.

When no key signal is input, the microcomputer returns the process to the step S13 and controls the manual display unit to display the manual (description of the corresponding terminal after selecting the next terminal) on the screen of the television.

Another embodiment of the present invention can be easily applied to various video apparatuses including a plurality of input/output terminals such as the PC. The method for connecting the television to the external apparatus is described in the present invention. However, description of the structures and manipulations of basic apparatuses, that is, the manual of input means such as a manipulation portion including various function keys or a remote controller can be graphically displayed.

As mentioned above, in the method for displaying the manual of the video apparatus according to the present invention and the apparatus therefor, the user can easily and correctly understand the usage of the television and the method for connecting the television to the external apparatuses by displaying the manual including the usage of the television and the method for connecting the television to the various external apparatuses on the screen of the television by simply inputting keys.

What is claimed is:

1. A method for displaying a user's manual for a video apparatus, the method comprising:
   determining whether a selection key signal for display of the user's manual is input;
   graphically displaying a portion of the video apparatus having a plurality of terminals according to the selection key signal;
   successively selecting and graphically marking sections of the plurality of terminals of the video apparatus in an initial predetermined display order;
   interrupting the initial predetermined display order upon a selection of at least one section of the plurality of terminals of the video apparatus by a user input; and
   displaying the user input selected at least one section of the video apparatus and portions of the user's manual corresponding to the at least one section of the video apparatus.

2. The method of claim 1, wherein said user's manual comprises images of the terminals.

3. The method of claim 1, wherein said user's manual comprises enlarged images of the terminals.

4. The method of claim 1, wherein said terminals of the video apparatus comprise a connector for connecting to a peripheral apparatus.

5. The method of claim 4, wherein, when an enter-key signal is input while portions of the user's manual corresponding to the connector are displayed, an operating mode of the video apparatus is adapted to operate the peripheral apparatus.

6. The method of claim 1, wherein said user's manual comprises at least one image of a manipulation portion of the video apparatus.

7. The method of claim 1, wherein the terminals of the video apparatus are terminals on a single component of the video apparatus.

8. A method for displaying a video, the method comprising:
   (a) determining whether a selection key signal for display of an instruction manual is input by a user;
   (b) graphically displaying multiple images of predetermined portions of a video apparatus and images of at least one peripheral apparatus according to the selection key signal;

(c) successively selecting and graphically highlighting the images of predetermined portions of the video apparatus; and (d) graphically and sequentially displaying corresponding portions of the instruction manual of a method for connecting the video apparatus to the at least one peripheral apparatus.

9. The method of claim 8, further comprising enlarging at least one image of predetermined portions of the video apparatus that is graphically highlighted.

10. The method of claim 8, wherein the step (b) is halted when a user selects at least one predetermined portion of the video apparatus for display.

11. The method of claim 8, wherein said predetermined portions of the video apparatus comprise a connector including at least one input/output terminal of the video apparatus for connecting to the at least one peripheral apparatus.

12. The method of claim 11, wherein, when a signal is input by the user while a portion of the instruction manual corresponding to the at least one input/output terminal connector is displayed, an operating mode of the video apparatus is adopted to operate the at least one peripheral apparatus.

13. The method of claim 8, wherein at least one predetermined portion of the video apparatus is a manipulation portion of the video apparatus.

14. The method of claim 8, further comprising displaying a message in on screen display (OSD) form.

15. The method of claim 8, wherein the predetermined portions of the video apparatus are portions of a single component of the video apparatus.

16. An apparatus for displaying a manual of a video apparatus, the apparatus comprising:

a manual data storage unit for storing manual data including the manual of a method for connecting the video apparatus to at least one peripheral apparatus and graphically displaying images of predetermined portions of the video apparatus;

a microcomputer for receiving a manual selection key signal received from a user and outputting a control signal; and a manual display unit for graphically displaying portions of the manual in a predetermined sequence on the screen of the video apparatus according to the control signal, wherein the control signal sets the predetermined sequence, wherein said manual display unit is adapted to successively and graphically highlight images of predetermined portions of the video apparatus, and to display an enlarged graphic of the at least one of the images on the screen of the video apparatus.

17. The apparatus of claim 16, wherein portions of the manual comprise at least one image of the at least one peripheral apparatus.

18. The apparatus of claim 16, wherein said predetermined portions of the video apparatus comprise a connector including one or more input/output terminals of the video apparatus for connecting to the at least one peripheral apparatus.

19. The apparatus of claim 18, wherein said microcomputer, when a signal is input, adapts an operating mode of the video apparatus to operate the at least one peripheral apparatus connected to the connector.

20. The apparatus of claim 16, wherein said predetermined portions of the video apparatus comprise a manipulation portion of the video apparatus.

21. The method of claim 1, wherein the user's manual comprises a message in on screen display (OSD) form.

22. The apparatus of claim 16, wherein the predetermined portions of the video apparatus are portions of a single components of the video apparatus.

* * * * *